Jan. 16, 1962 R. J. WRIGHTON ETAL 3,016,760
CONTROL LINE REGULATOR
Original Filed Jan. 30, 1956

CLIFFORD E. CUSHMAN
ROBERT J. WRIGHTON
INVENTORS

BY *Paul B. Hunter*

ATTORNEY

United States Patent Office 3,016,760
Patented Jan. 16, 1962

3,016,760
CONTROL LINE REGULATOR
Robert J. Wrighton, Tarzana, and Clifford E. Cushman, Burbank, Calif., assignors, by mesne assignments, to Pacific Scientific Company, San Francisco, Calif., a corporation of California
Original application Jan. 30, 1956, Ser. No. 562,073, now Patent No. 2,921,480, dated Jan. 19, 1960. Divided and this application June 25, 1959, Ser. No. 845,046
5 Claims. (Cl. 74—501.5)

This invention relates in general to control line apparatus, and more particularly to control line regulators utilized for maintaining uniform tension in control lines extending between controlling and controlled points, the regulator acting automatically to compensate for variations in length of the lines resulting from such things as extreme temperature changes.

These tension regulators find their main use in modern aircraft where the flexing of air frames and operations in widely divergent temperature environments result in relatively rapid and pronounced variations in distance between control and controlling points. These regulators in common use consist of one or more compression or regulator springs, which exert a tension on the control lines or cables equal to the desired rig load of the cable system, plus an automatically locking mechanism which, although it allows the regulator spring forces to be exerted on the cables so long as the cables are under neutral or balanced forces, i.e., tension on the control cables are equal, to thereby maintain the desired rig loading, it locks up immediately upon a control force being applied to one of the control cables to prevent further tension regulating movement and to transmit the control force to the controlled point.

In these control regulators heretofore used it often happens that the control force applied to one of the cables is great enough to cause this cable to be stretched somewhat during the period the force is being applied. This causes undesired slack to be produced in the untensioned cable, resulting at times in fouling of the control lines, which these prior art regulators were incapable of preventing. This and other drawbacks to the prior art devices will be explained more fully in the detailed description of this invention to follow.

The present application is a division of U.S. patent application Serial No. 562,073, filed January 30, 1956, now Patent No. 2,921,480 dated January 19, 1960 by the same inventors.

It is, therefore, the principal object of the present invention to provide novel improved control line tension regulator devices which are fast-acting, dependable in operation, and maintain taut lines at all times.

One feature of the present invention is the provision of a novel control line regulator structure which operates to automatically take up slack in an associated control line during periods when the control line regulator is normally locked against control line tension regulation.

Another feature of the present invention is the provision of a novel spring structure for use in control line regulator devices for taking up slack in control lines occurring during periods when the regulator is locked.

Another feature of the present invention is the provision of a control line tension regulator device having spring means incorporated therein in addition to the normal tension regulator spring means for taking up slack in the control lines during the period when the regulator is normally locked against tension regulation.

These and other features and advantages of the present invention will become more apparent from a perusal of the following specification taken in connection with the accompanying drawings wherein.

Figure 1:
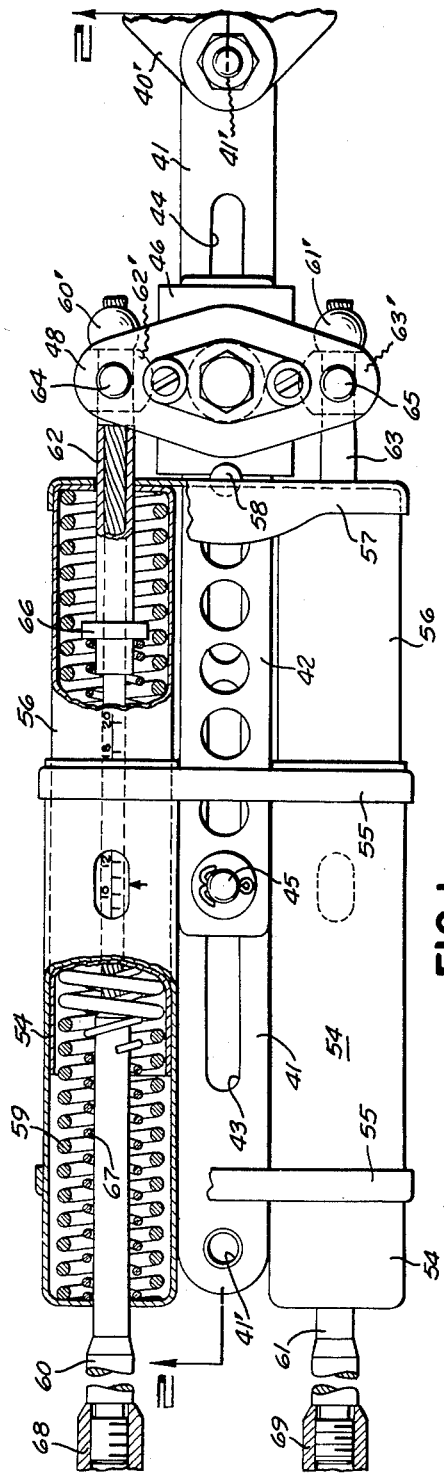
FIG. 1 is a plan view, partially cut away and in cross-section, of a type of cable regulator device which embodies the present invention.
Figure 2:
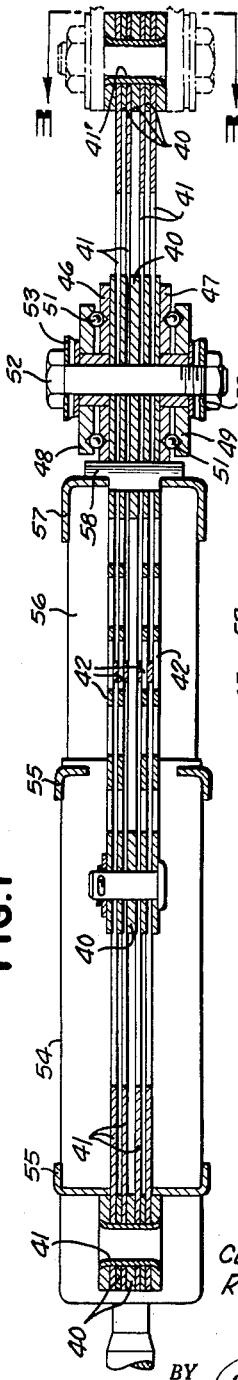
FIG. 2 is a longitudinal cross-section view of the apparatus of FIG. 1 taken along section line 2—2.
Figure 3:
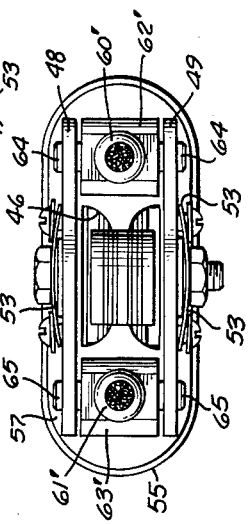
FIG. 3 is an end view of the regulator taken at section line 3—3 in FIG. 2.

There is shown in FIGS. 1, 2, and 3, a type of cable tension regulator device which incorporates the novel slack-absorber feature of this invention. A plurality of elongated main frame leaves 41 are secured together in a stacked, spaced-apart relationship and are interleaved with another plurality of frame leaves 42, the leaves 42 being adapted to slide back and forth along leaves 41. Spacers, such as washers 40, serve to maintain the leaves 41 and 42 properly spaced. The leaves 41 are secured together at their ends by bushings 41', right-hand bushing 41' serving to mount this regulator device to a base member 40'. The leaves 41 have formed therein two elongated slots 43 and 44. A pin 45 extends through slot 43 to retain the leaves 42 together and in alignment with leaves 41 at one end, the pen being adapted to slide within the slot 43. A tilting lock assembly is secured on the other end of the stacked leaves 42 and comprises a pair of pressure plates 46 and 47 and a pair of associated wrist plates 48 and 49, there being sandwiched between the wrist and pressure plates, in accommodating recesses or grooves, a plurality of small steel balls 51. The lock assembly is held together by bolt 52 which is prevented from tightening or loosening by a pair of spring clips 53. The bolt 52 holds the wrist plates 48 and 49, the pressure plates 46 and 47, and the stacked leaves in a loosened condition so that, with the lock assembly aligned as in FIG. 1, the leaves 42 may slide between the leaves 41 to allow normal expansion and contraction of the regulator cables.

A pair of tubular outer guides or casings 54 are fixedly secured together and to the main frame leaves 41 by brackets 55. A pair of tubular inner guides or casings 56, arranged to telescope within guides 54, are fixedly secured together by a bracket 57 and are coupled to the leaves 42 and the lock assembly by pin 58.

Extending longitudinally within each telescoped guide pair 54, 56 is a compression-regulator spring 59, the ends of the compressed spring bearing against the ends of the guides. Extending axially through each guide pair, 54, 56 is a control cable termination 60 and 61, respectively. The end of each cable termination also comprises attached rigid sheaths 62 and 63 which are longitudinally slidably mounted in apertured blocks 62' and 63' pivotally mounted between the associated ends of the wrist plates 48 and 49 by trunnions 64 and 65, respectively. Integral with the inner ends of each sheath 62 and 63 is a collar 66. Springs 67 encircle each cable termination 60 and 61 and are compressed between the ends of outer guide tubes 54 and the collars 66.

In operation, this novel regulator device is mounted at its right-hand end to a base such as 40'. The cable terminations 60 and 61 are coupled to a pair of controlling cables 68 and 69 coming from a controlling point. The controlling and controlled system in which this type of regulator is utilized is known in the art, and a prior art device may be seen in U.S. Patent #2,280,106 issued April 12, 1942, to John Sturgess, entitled "Cable Tension Controller." The controlling cables are kept taut by the tension forces exerted thereon by regulator springs 59 through the right-hand ends of guides 56, bracket 57, the lock assembly including pin 58 and wrist plates 48 and 49, and block members 62' and 63' pressing against the ball ends 60' and 61' of cable terminations 60 and 61. As the normal tensions in the controlling cables 68 and 69 vary with changing temperatures and the like, the leaves 42 and lock assembly 46–52 slide back and forth on main frame leaves 41 until the tension regulator springs 59 and the cable tensions are balanced.

When a working force is applied to one or the other of cables 63, 69, this unequal force is transmitted to one end of the wrist plates 48, 49 and the wrist plates are turned on bolt 52 or cant relative to the leaves 41, 42. The wrist plates, therefore, jam down on the steel balls 51 which in turn compress the pressure plates 46 and 47 and force the leaves 42 to squeeze in on the leaves 41. The lock assembly thereby jams or locks on the main frame leaves 41 and prevents the cable on which the working force is being exerted from playing out. Thus, the control action is applied to the controlled mechanism (not shown).

If the working force is heavy, the tensioned cable will have a tendency to stretch and a slack will result in the untensioned cable. The compressed spring 67 bearing on the collar 66 will cause the slack cable to slide to the right as viewed in FIG. 1, sheath 62 or 63 sliding through blocks 62' or 63' as the case may be, thereby taking up any slack in the untensioned cable until such time as the heavy working force is removed from the other cable.

Since many changes could be made in the above construction of the control line regulator and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control line tension regulator device comprising a main frame structure, a lock means slidably mounted on said main frame and arranged to carry a pair of control lines slidably seated therein, a regulator spring associated with each of said control lines, said regulator springs exerting a resilient force on said lock means relative to said main frame to urge said lock means to slide on said main frame structure to uniformly tension the control lines seated therein, said lock means canting on said main frame structure when the tension applied to either one of said control lines exceeds the tension of the other line to lock said lock means to said frame to prevent any further play-out movement of the control lines relative to the main frame, and means associated with each of said control lines for exerting a take-up force on said control lines whereby any slack developed in the control line having the lesser tension during the locked condition of the regulator may be taken up, the slack control line sliding with respect to the lock means.

2. A control line tension regulator device as claimed in claim 1 wherein said next to last means comprises a slack absorber compression spring associated with each of said control lines, each of said springs acting between the main frame and its associated control line, said spring exerting the take-up force on said associated control line.

3. A control line tension regulator device comprising a main frame structure, said main frame structure including a plurality of elongated leaves fixedly stacked together in a spaced-apart relationship, a regulator locking assembly comprising a second plurality of elongated leaves secured together and interleaved with the leaves of said main frame structure and adapted to slide longitudinally on said main frame structure and a lock plate assembly extending transversely of and pivotally mounted on said second plurality of leaves and adapted to carry a pair of control lines slidably seated in opposite ends of said lock plate assembly, regulator spring means associated with each of said control lines, said regulator spring means exerting a resilient force on said lock plate assembly, said lock plate assembly and said second plurality of leaves sliding longitudinally back and forth on said main frame to uniformly tension the control cables seated in the lock plate assembly, said lock plate assembly canting on said leaves when the tension in one of said control cables substantially exceeds the tension in the other line, means coupled to said lock plate assembly and operated on canting thereof to bind the second plurality of leaves to the main frame leaves and therefore prevent relative sliding motion of the lock plate assembly on said main frame to prevent any further play-out movement of the control lines, and means associated with each control line acting between the line and said main frame member for exerting a control line take-up force on said lines whereby slack developed in the control line having the lesser tension during the locked condition of the regulator may be taken up, the slack control line sliding with respect to the lock plate assembly.

4. A control line tension regulator device as claimed in claim 3 wherein said last means includes a slack absorber compression spring associated with each of said control lines, each of said springs acting between the main frame structure and its associated control line, said spring exerting the slack take-up force on said associated control line.

5. A cable tension regulator comprising a plurality of elongated stacked leaves, spaced apart and provided with means at one end for securing them as a unit to a support, a regulator locking assembly embracing and slidable along said leaves, said locking assembly including a second plurality of leaves interleaved with said first leaves and carried by said locking assembly, regulator spring means resisting one-way movement of said locking assembly along said first leaves, means adapted for slidably mounting a pair of cables to said locking assembly for pulling same to slide along said first leaves in opposition to said regulator spring means, means in said locking assembly operated by an unbalanced pull on said cables clamping said first and second plurality of leaves together within said locking assembly, thereby locking the locking assembly against sliding along said first plurality of leaves during said unbalanced pull, and resilient means associated with each control line and acting on said associated control line whereby slack developed in the control line having the lesser tension during the locked condition of the regulator may be taken up, the slack control line slidably moving along said lock assembly.

References Cited in the file of this patent
UNITED STATES PATENTS

| | | |
|---|---|---|
| 1,980,172 | Ball | Nov. 13, 1934 |
| 2,280,106 | Sturgess | Apr. 21, 1942 |
| 2,399,793 | Cushman | May 7, 1946 |
| 2,489,163 | Schwimmer | Nov. 22, 1949 |